US00RE40202E

(19) United States
(12) Reissued Patent
Funaki et al.

(10) Patent Number: US RE40,202 E
(45) Date of Reissued Patent: Apr. 1, 2008

(54) INK RIBBON CASSETTE FOR THERMAL TRANSFER PRINTER

(75) Inventors: Hitoshi Funaki, Iwate-ken (JP); Mitsuo Tsushima, Iwate-Ken (JP); Eihin Setsu, Iwate-ken (JP)

(73) Assignee: ALPS Electric Co., Ltd, Tokyo (JP)

(21) Appl. No.: 11/025,832
(22) Filed: Dec. 28, 2004

Related U.S. Patent Documents

Reissue of:
(64) Patent No.: 6,504,564
Issued: Jan. 7, 2003
Appl. No.: 09/771,297
Filed: Jan. 25, 2001

(30) Foreign Application Priority Data

Jan. 28, 2000 (JP) ..... 2000-024728

(51) Int. Cl.
*B41J 32/00* (2006.01)
*B41J 17/28* (2006.01)
*B41J 17/30* (2006.01)
*B41J 17/32* (2006.01)

(52) U.S. Cl. ..... 347/214; 400/207; 400/208.1; 400/248

(58) Field of Classification Search ..... 347/214, 347/216

See application file for complete search history.

(56) References Cited

U.S. PATENT DOCUMENTS

| | | | |
|---|---|---|---|
| 4,978,240 | A | 12/1990 | Katsuno |
| D446,239 | S | 8/2001 | Funaki |

FOREIGN PATENT DOCUMENTS

| | | | |
|---|---|---|---|
| DE | 3742337 | | 6/1989 |
| EP | 0 294 792 | * | 12/1988 |
| EP | 0294792 | | 8/1991 |
| EP | 0 869 009 | * | 7/1998 |
| EP | 0 857 580 | * | 8/1998 |
| EP | 0869009 | | 11/1999 |
| EP | 0857580 | | 4/2003 |
| JP | 1-152086 | | 6/1989 |
| JP | 05 254229 | * | 5/1993 |
| JP | 05169778 | | 7/1993 |
| JP | 05 169778 | * | 9/1993 |
| JP | 05254229 | | 10/1993 |
| JP | 09-267499 | | 10/1997 |

OTHER PUBLICATIONS

Notification of Reasons for Refusal dated Jun. 14, 2005 for corresponding Japanese Patent Application No. 2000–024728.

EPO Search Report for Patent Application No. EP 01 30 0106, Aug. 13, 2002, 3 pages.

* cited by examiner

*Primary Examiner*—Huan Tran
(74) *Attorney, Agent, or Firm*—Brinks Hofer Gilson & Lione

(57) ABSTRACT

A ribbon cassette 10 includes a cassette case 11 having a first accommodating portion 12, a second accommodating portion 13, and a connecting portion 14 connecting the first and second accommodating portions 12 and 13, a feeding core 12 and a take-up core 42 rotatably accommodated respectively in the first and second accommodating portions 12 and 13, and an ink ribbon R having a large width which can be fed from the feeding core 40 and taken up by the take-up core 42 through a connecting member 14, wherein there is provided in the first accommodating portion 12 in the vicinity of the connecting member 14 a shaft 19 extending along the direction of the width of the ink ribbon R, wherein there is provided in the connecting member 14 an edge portion 18a of a wall portion 18 opposed to the shaft 19, and wherein the ink ribbon R fed out from the feeding core 40 is bent at the shaft 19, and then bent in the opposite direction by the edge portion 18a before it is taken up by the take-up core 42, whereby it is possible to provide an ink ribbon cassette in which it is possible to achieve an overall reduction in size and in which the ink ribbon can be fed in a stable manner.

33 Claims, 11 Drawing Sheets

INK RIBBON CASSETTE FOR THERMAL TRANSFER PRINTER

Matter enclosed in heavy brackets [ ] appears in the original patent but forms no part of this reissue specification; matter printed in italics indicates the additions made by reissue.

BACKGROUND OF THE INVENTION

1. Field of the Invention

The present invention relates to an ink ribbon cassette for a thermal transfer printer and, in particular, to an ink ribbon cassette suitable for a small line-type thermal transfer printer.

2. Description of the Related Art

As a recording apparatus for performing recording quickly on recording paper line by line or page by page, a line printer is generally used which has an elongated thermal head in which heat generating elements are arranged along the width direction of the recording paper.

This line printer uses a ribbon cassette in which a take-up core and a feeding core around which an ink ribbon is wound from both ends are rotatably arranged in a substantially rectangular cassette case so as to be spaced apart from each other, and in which there is formed between the cores an ink ribbon feeding path through which the ink ribbon is fed from the feeding core side to the take-up core side. When attaching this ribbon cassette to the line printer, the thermal head of the line printer is positioned between the cores, and the thermal head is positioned through the intermediation of the ink ribbon positioned in the feeding path, the thermal head being brought into press contact with the platen through the intermediation of this ink ribbon.

And, in a line printer, there is a demand for a reduction in the size of the entire apparatus. In the ribbon cassette also, which is attached to this line printer, a reduction in size is an object to be achieved.

However, in the ribbon cassette, the space portion accommodating the ink ribbon wound around the cores called a pancake occupies the greater portion thereof, so that the size of the cassette case is large, making it difficult to achieve a reduction in size.

And, in correspondence with the reduction in the size of the ribbon cassette, it is also difficult to achieve a reduction in the size of the line printer accommodating the ribbon cassette.

SUMMARY OF THE INVENTION

It is an object of the present invention to provide a ribbon cassette which makes it possible to achieve a reduction in the size of the entire ribbon cassette and which makes it possible to feed the ink ribbon in a stable manner.

As a first means for solving one of the above problems, there is provided an ink ribbon cassette comprising a first accommodating portion, a second accommodating portion arranged so as to be spaced apart by a predetermined distance from the first accommodating portion, a cassette case having a connecting portion connecting the first and second accommodating portions, a feeding core and a take-up core rotatably accommodated respectively in the first and second accommodating portions, and an ink ribbon wider than printing width which can be fed from the feeding core and taken up by the take-up core, wherein there is provided in the first accommodating portion a first support portion extending along the ink ribbon width direction, wherein there is provided a second support portion opposed to the first support portion, and wherein the ink ribbon fed out from the feeding core is bent at the first support portion, and then bent in the opposite direction by the second support portion before it is taken up by the take-up core.

Further, as a second solving means, there is provided an ink ribbon cassette wherein the first support portion consists of a shaft connecting a side plate portion of the cassette case and a side surface portion of the first accommodating portion.

Further, as a third solving means, there is provided an ink ribbon cassette wherein the shaft is rotatable around an axis.

Further, as a fourth solving means, there is provided an ink ribbon cassette wherein the connecting portion consists of a pair of connecting members connecting the end portions of the first and second accommodating portions, the second support portion consisting of a wall portion connecting a part of the pair of connecting members.

DESCRIPTION OF THE PREFERRED EMBODIMENTS

An ink ribbon cassette 10 according to an embodiment of the present invention will now be described with reference to the drawings.

Figure 1:
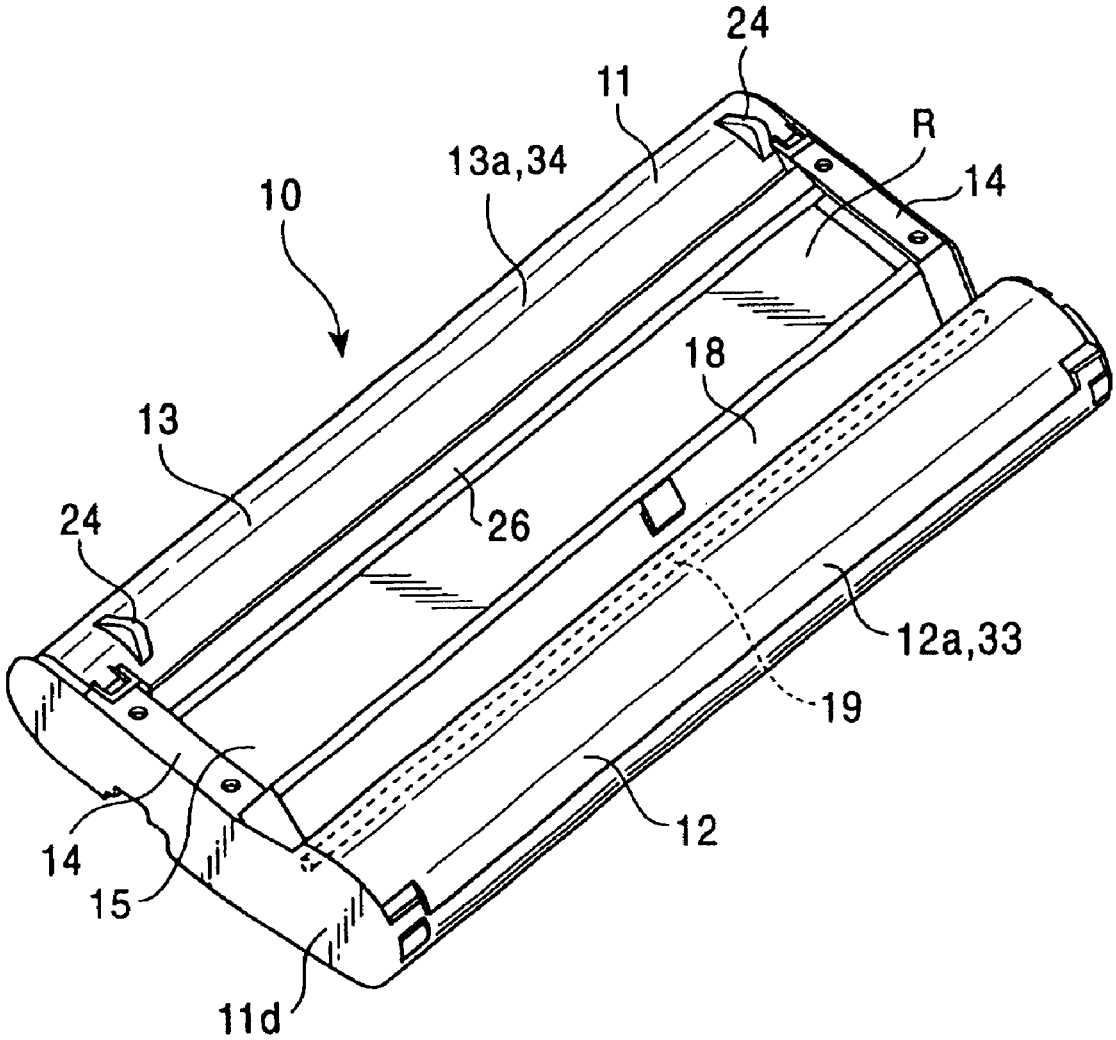
FIG. 1 is an overall view of an ink ribbon cassette according to an embodiment of the present invention.

As shown in FIG. 1, the ink ribbon cassette 10 has a resin cassette case 11 in a substantially box-like configuration.

This cassette case 11 integrally comprises a cylindrical first accommodating portion 12, a second accommodating portion 13 which is spaced apart from the first accommodating portion by a predetermined distance and which is cylindrical, and a pair of connecting members 14 connecting the end portions of the first and second accommodating portions 12 and 13, the sectional configuration of the whole being substantially crank-like.

Formed in this cassette case 11 are a rectangular central hole 15 surrounded by the pair of connecting members 14 and the first and second accommodating portions 12 and 13 and a substantially elliptical side plate portion 11d formed by integrally connecting one end surfaces of the first and second accommodating portions and a single connecting member 14 arranged between the one end surfaces.

Integrally formed in the first accommodating portion 12 is a flat extension portion 12s (See FIG. 8) extending from one edge portion of the peripheral wall portion 12a thereof toward the pair of connecting members 14.

Figure 2:
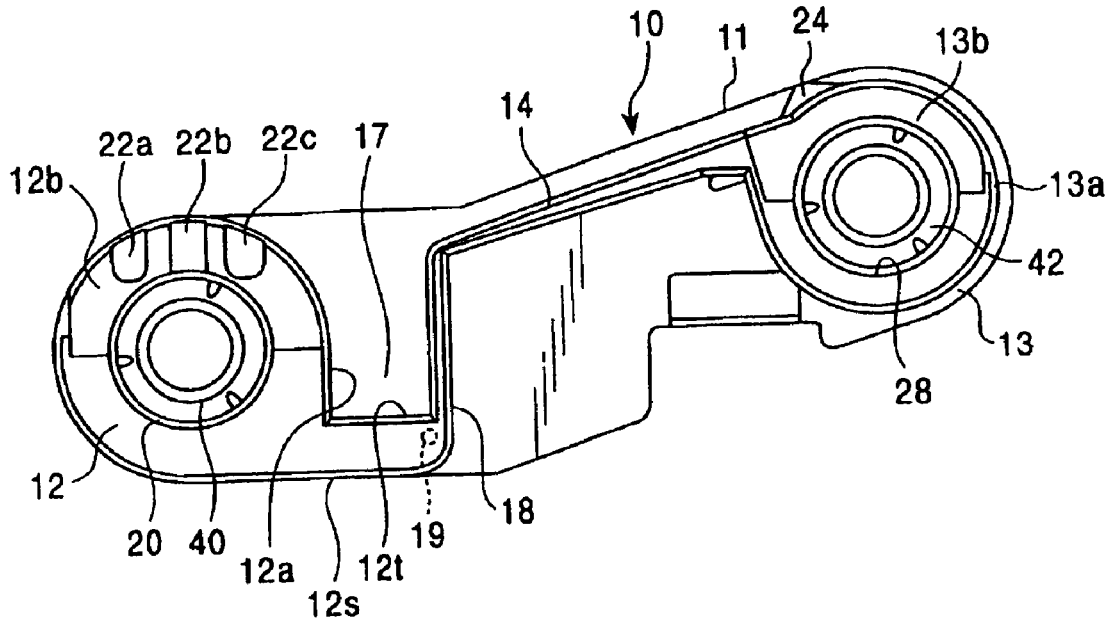
FIG. 2 is a side view of an ink ribbon cassette according to an embodiment of the present invention.

As shown in FIG. 2, in the pair of connecting members 14, there is provided a flat wall portion 18 connecting parts of the pair of connecting members 14, and this wall portion 18 is arranged opposite to the peripheral wall portion 12a so as to provide a fixed space portion 17 between the wall portion 18 and the peripheral wall portion 12a of the first accommodating portion 12. And, this wall portion 18 is integrally connected to the forward end portion of the extension portion 12s so as to be bent substantially at right angles with respect to the extension portion 12s.

Figure 3:
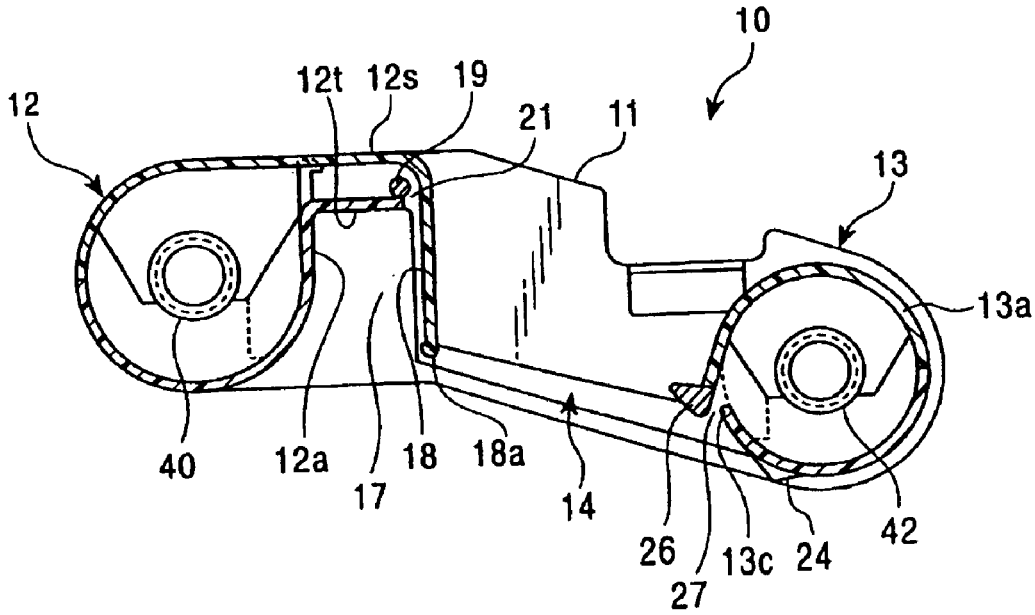
FIG. 3 is a longitudinal sectional view of an ink ribbon cassette according to an embodiment of the present invention.

And, as shown in FIG. 3, the edge portion (second support portion) 18a of the wall portion 18 is of a rounded configuration, and constitutes a support portion when the ink ribbon R is brought into slide contact. In the first accommodating portion 12, there is integrally provided on the other edge portion, which is a free end of the peripheral wall portion 12a thereof, a flat extension member 12t opposed to the extension portion 12s.

Further, the portion between the extension member 12t of the peripheral wall portion 12a and the wall portion 18 constitutes a feeding outlet 21 for feeding out the ink ribbon R wound around the feeding core 40 to the recording position.

As shown in FIG. 2, formed in the first accommodating portion 12 are a circular side surface portion 12b provided on the other end surface of the cylindrical peripheral wall portion 12a and an opening 20 which is also circular and formed on this side surface portion 12b. On the surface of the side surface portion 12b, there are regularly arranged at least one recessed cutout portions 22a, 22b and 22c, making it possible to recognize the kind of the ink ribbon R accommodated in the ribbon cassette 10.

In the second accommodating portion 13, there are formed on the outer peripheral surfaces on both sides of the peripheral wall portion thereof 13a a pair of outwardly protruding guide protrusions 24, and a part of the peripheral wall portion 13a is made flat by these guide protrusions 24.

As shown in FIGS. 3 and 1, in the second accommodating portion 13, there is provided in the large diameter edge portion of the cylindrical peripheral wall portion 13a a slightly outwardly extending tapered flange portion 26 so as to extend along the edge portion thereof, the ends of the flange portion 26 being integrally connected to the connecting members 14. In contrast, the small diameter edge portion 13c of the peripheral wall portion 13a is arranged opposite to the large diameter edge portion (flange portion 26) of the peripheral wall portion 13a so as to be of a spiral configuration extending inwardly.

The portion between the flange portion 26 and the edge portion 13c of the peripheral wall portion 13a constitutes a take-up inlet 27 for taking up the used ink ribbon R on the take-up core 42.

Further, as shown in FIG. 2, in the second accommodating portion 13, as in the first accommodating portion 12, there is formed a similarly circular opening 28 opposed to the side wall portion lid and provided in the circular side surface portion 13b provided on the other end surface of the peripheral wall portion 13a.

Figure 4:
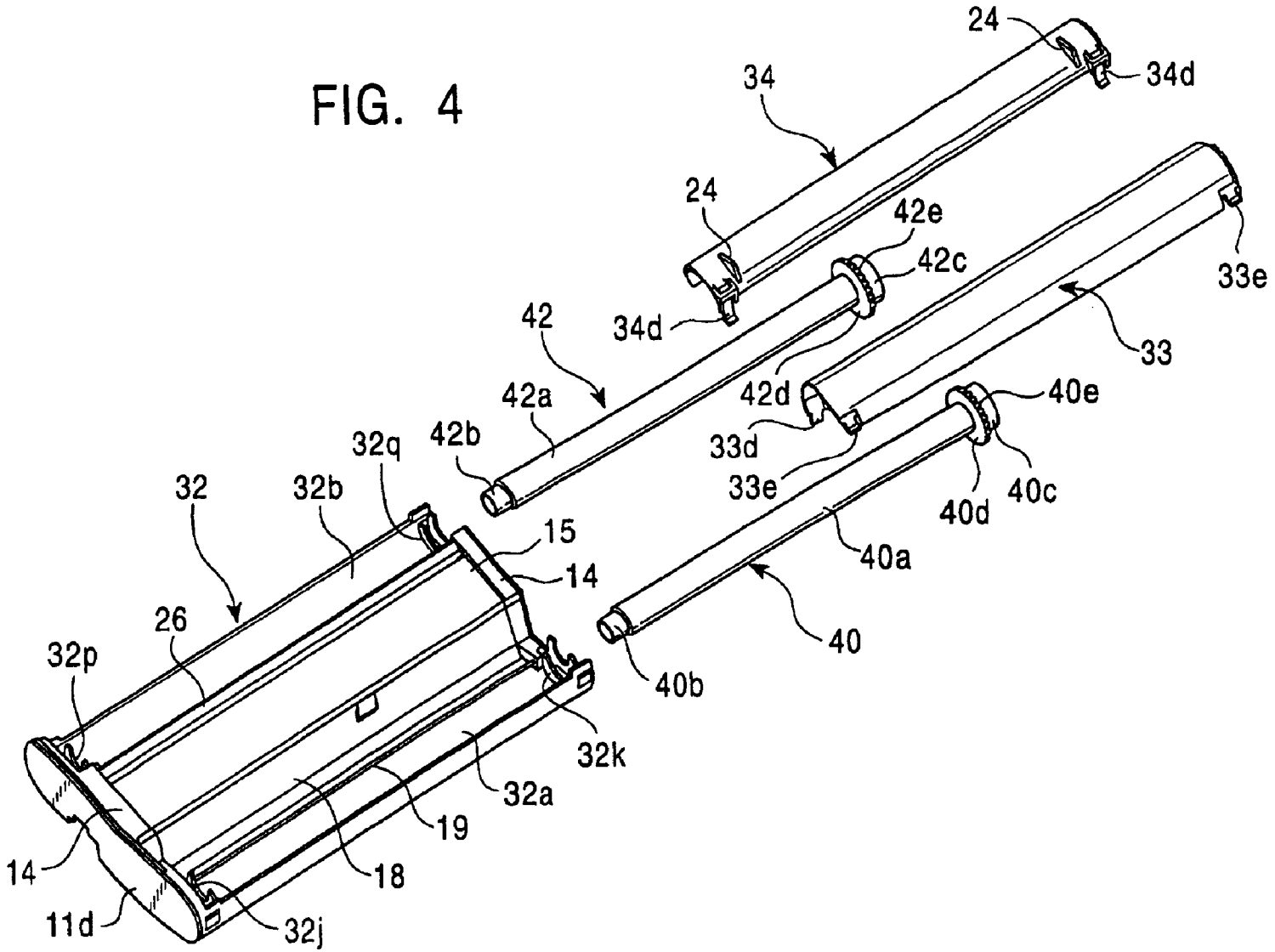
FIG. 4 is an exploded perspective view of an ink ribbon cassette according to an embodiment of the present invention.

The cassette case 11 having the above-described outward appearance comprises, as shown in FIG. 4, three parts consisting of one lower case 32 and two upper cases (first upper case 33 and second upper case 34).

Thus, the first accommodating portion 12 comprises a part of the lower case 32 (first semi-cylindrical portion 32a described below) and the first upper case 33 constituting the upper half thereof, and the second accommodating portion 13 comprises the other portion of the lower case 32 (the second semi-cylindrical portion 32b described below) and the second upper case 34 constituting the upper half thereof.

The lower case 32 has at the center the above-described hole portion 15, and on both sides thereof the first semi-cylindrical portion 32a and the second semi-cylindrical portion 32b, the pair of connecting members connecting the first and second semi-cylindrical portions 32a and 32b and the side plate portion 11d.

Further, in the lower case 32, as shown in FIG. 3, there is mounted a rotatable metal shaft 19 (first support portion) so as to extend along the extension portion 12s and connect the side plate portion lid and the side surface portion 12b (lower half).

The ink ribbon R (See FIG. 15) comes into slide contact with this shaft 19. In the shaft 19 in which the slide resistance is reduced, one which does not rotate is also acceptable.

Further, it is also possible to omit the shaft 19 coming into slide contact with the ink ribbon R and round off the forward end of the extension portion 12s to reduce the slide resistance, allowing the ink ribbon R to come into direct slide contact with the forward end portion thereof as the first support portion.

Figure 5:
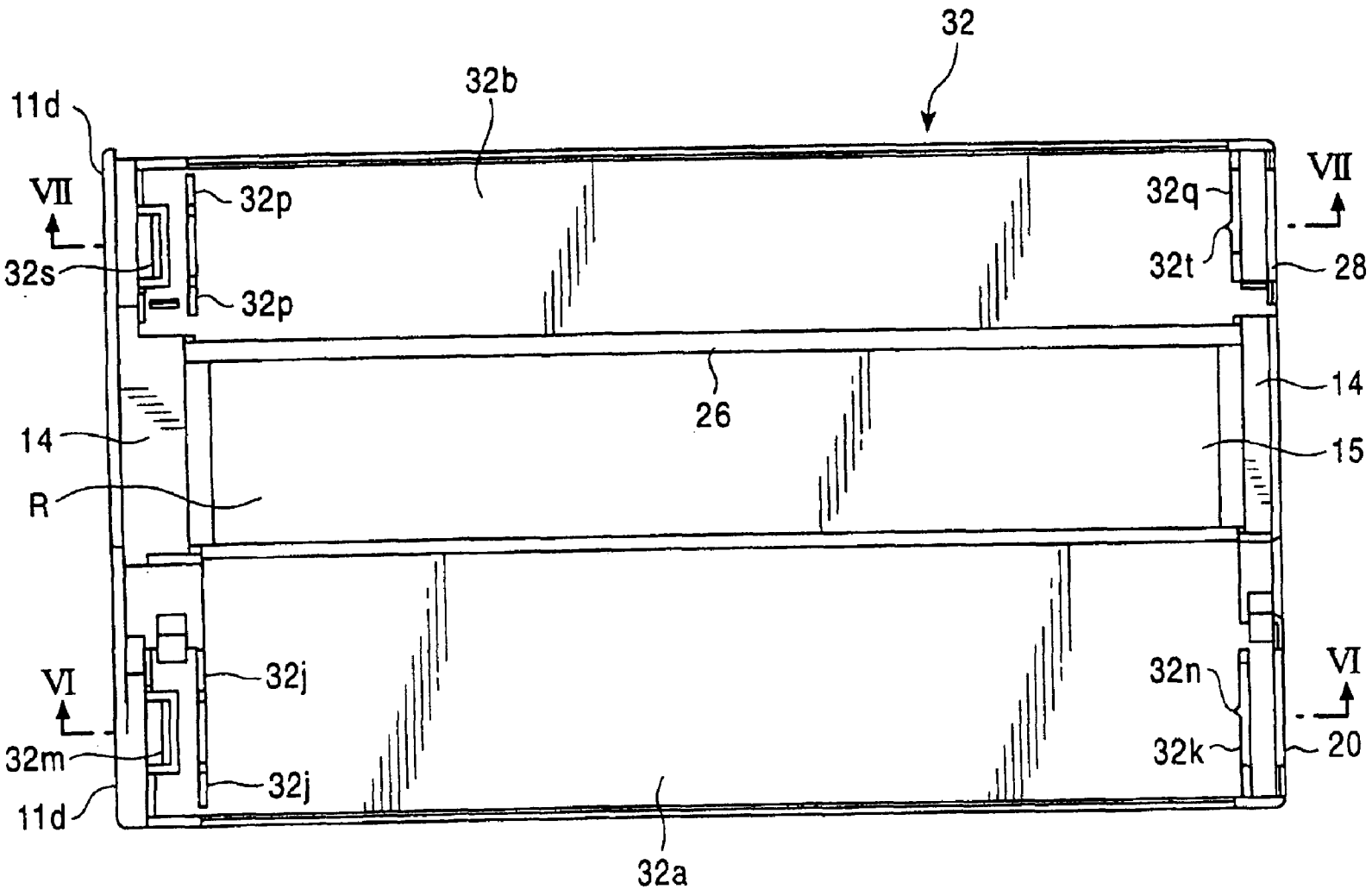
FIG. 5 is a rear view of a lower case of an ink ribbon cassette according to an embodiment of the present invention.
Figure 6:
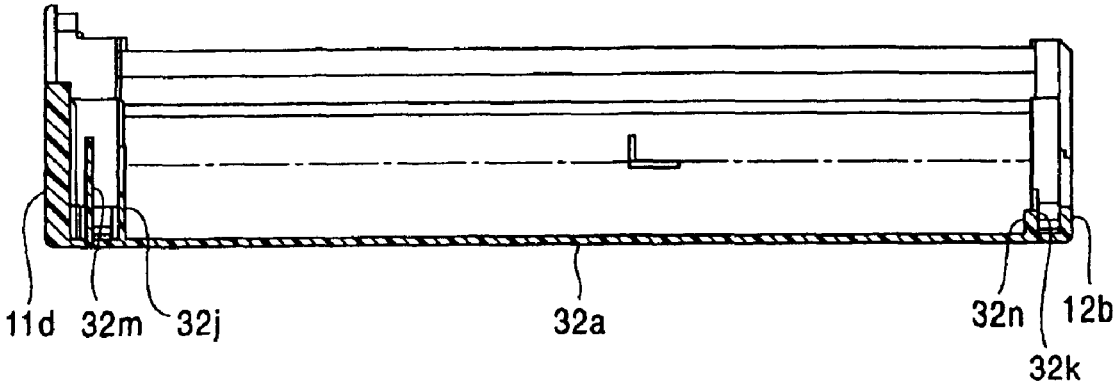
FIG. 6 is a sectional view taken along the dashed line 6—6 of FIG. 5.
Figure 7:
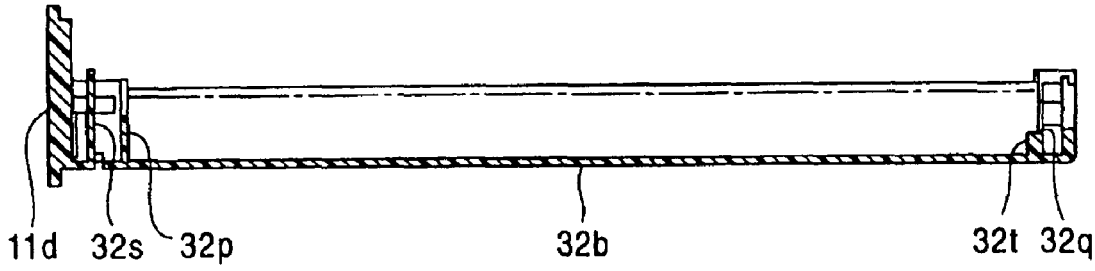
FIG. 7 is a sectional view taken along the dashed line 7—7 of FIG. 5.

As shown in FIGS. 5 and 6. in the inner wall of the peripheral wall portion of the first semi-cylindrical portion 32a, there is provided a U-shaped first support wall 32j (See FIG. 8) opposite to the side plate portion 11d.

Between this first support wall 32j and the side plate portion 11d, there are formed elastic mold members 32m (See FIG. 8) formed by cutting and raising inwardly from the peripheral wall portion of the first semi-cylindrical portion 32b at fixed intervals between the side plate portion 11d and the first support wall 32j.

Figure 9:
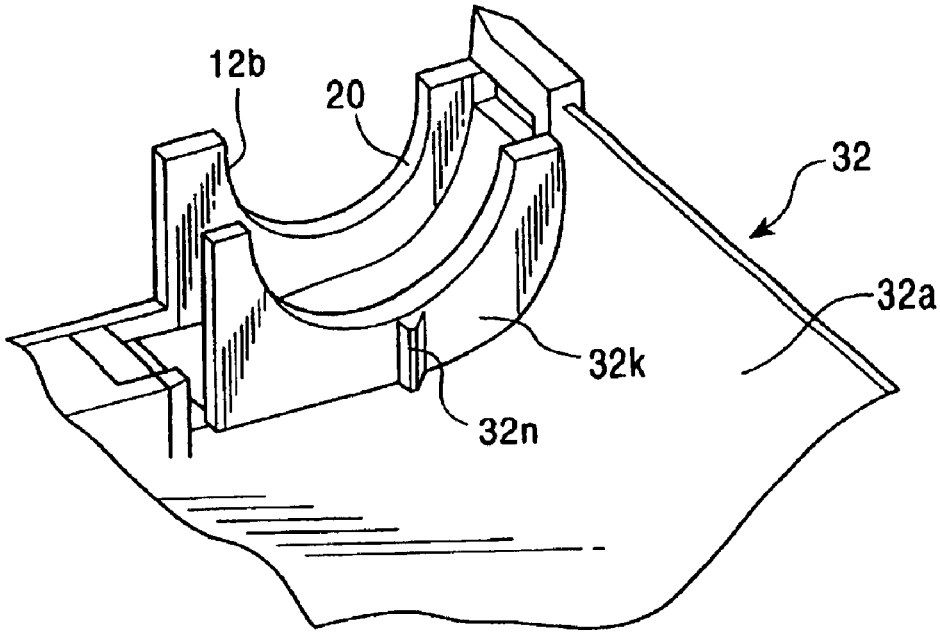
FIG. 9 is an enlarged perspective view of a main portion of a lower case of an ink ribbon cassette according to an embodiment of the present invention.

On the other hand, the first semi-cylindrical portion 32a has in the inner wall of the peripheral wall portion thereof a second support wall 32k (See FIG. 9) in the form of a U-shaped cutout in the end surface of the peripheral wall portion at a fixed distance from the side surface portion 12b.

And, in the wall surface portion of the second support wall 32k, there protrudes an engagement protrusion 32n of a triangular sectional configuration opposite to the first support wall 32j.

Similarly, in the second semi-cylindrical portion 32b also, a third support wall 32p is provided in the inner wall of the peripheral wall portion on the side plate portion 11d side, and a fourth support wall 32q is provided in the inner wall of the peripheral wall portion on the side surface portion 13b side. And, in the second semi-cylindrical portion 32b, there is provided in the inner wall of the peripheral wall portion and between the side plate portion 11d and the third support wall 32p a mold member 32s formed so as to be elastic by cutting and raising as in the case of the mold member 32m. In the wall surface portion of the fourth support wall 32q, there is provided an engagement protrusion 32x of a triangular sectional configuration in the similar manner as the engagement protrusion 32n.

Figure 12:
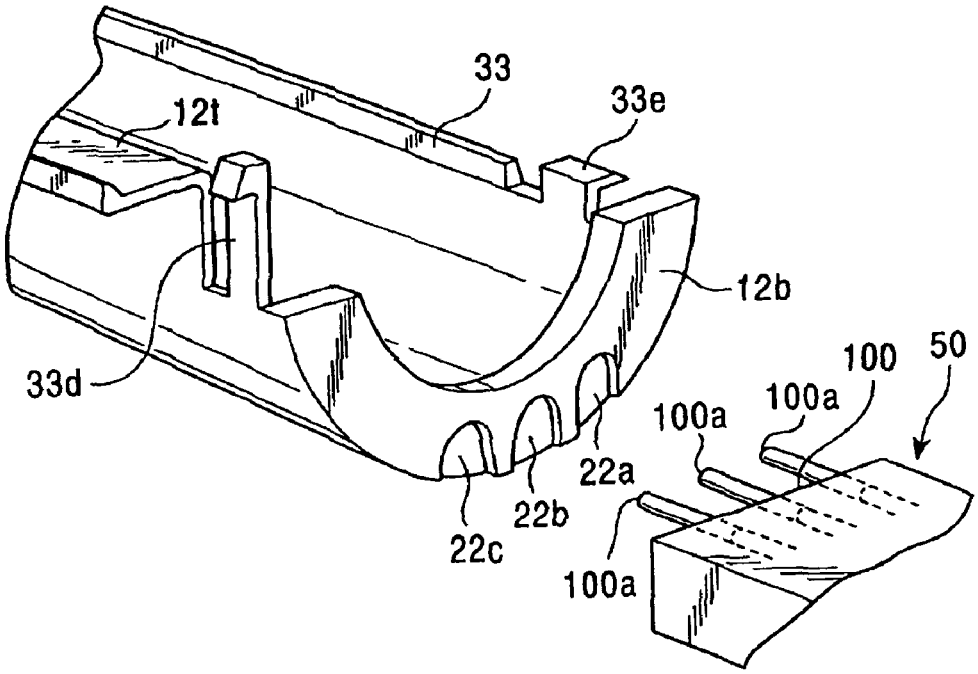
FIG. 12 is an enlarged perspective view illustrating the relationship between the upper case and the attachment portion of the lower case of an ink ribbon cassette according to an embodiment of the present invention.

Next, as shown in FIGS. 4 and 12, the first upper case 33 has in the both end edges of the peripheral wall portion thereof elastic engagement claws 33d and 33e.

The second upper case 34 has in both end edges of the peripheral wall portion thereof elastic engagement claws 34d and adjacent to the guide protrusion 24.

Figure 10:
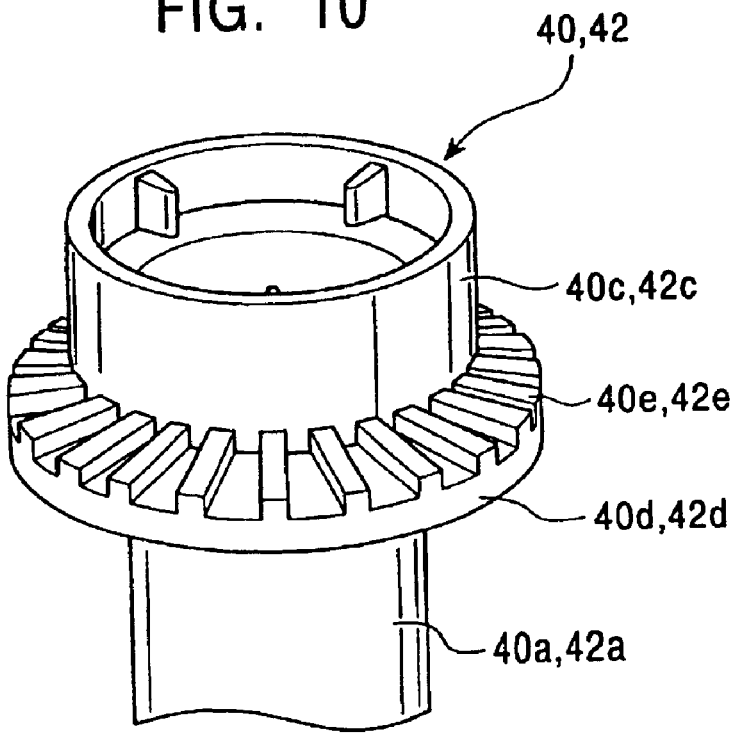
FIG. 10 is an enlarged perspective view of a main portion of a ribbon core of an ink ribbon cassette according to an embodiment of the present invention.

Next, as shown in FIG. 4, both the feeding core 40 and the take-up core 42 consist of substantially cylindrical members made of resin of the same size, respectively comprising cylindrical base portions 40a and 42a provided at the center, small diameter portions 40b and 42b which are of a smaller diameter than the base portions 40a and 42a provided at one end, and large diameter portions 40c and 42c which are of a larger diameter than the base portions 40a and 42a provided at the other end. And, in these large diameter portions 40c and 42c, there are provided flange portions 40d and 42d in the border between them and the base portions 40a and 42a, and in the outward surface portions of these flange portions 40d and 42d, there are formed a plurality of rectangular grooves 40e and 42e, which are uniformly arranged around the shaft (See FIG. 10).

And, around the base portion 40a of the feeding core 40, the ink ribbon R is wound, and the ink ribbon R is wound round the base portion 42 of the take-up core 42 from the forward end edge portion thereof.

The rectangular grooves 40e and 42e of the feeding core 40 and the take-up core 42 are engaged with the engagement protrusions 32n and 32t of the second and fourth support wall portions 32k and 32q, whereby engagement is reliably effected, and when the cassette is not used, for example, when the ribbon cassette 10 is carried, there is no fear of the ink ribbon R being slackened to come into slide contact with the cassette case 11.

Next, the assembly of the ribbon cassette 10 will be described.

As shown in FIG. 4, the lower case 32 is first prepared, and the feeding core 40 is inserted from above into the first semi-cylindrical portion 32a of the lower case 32.

Figure 8:
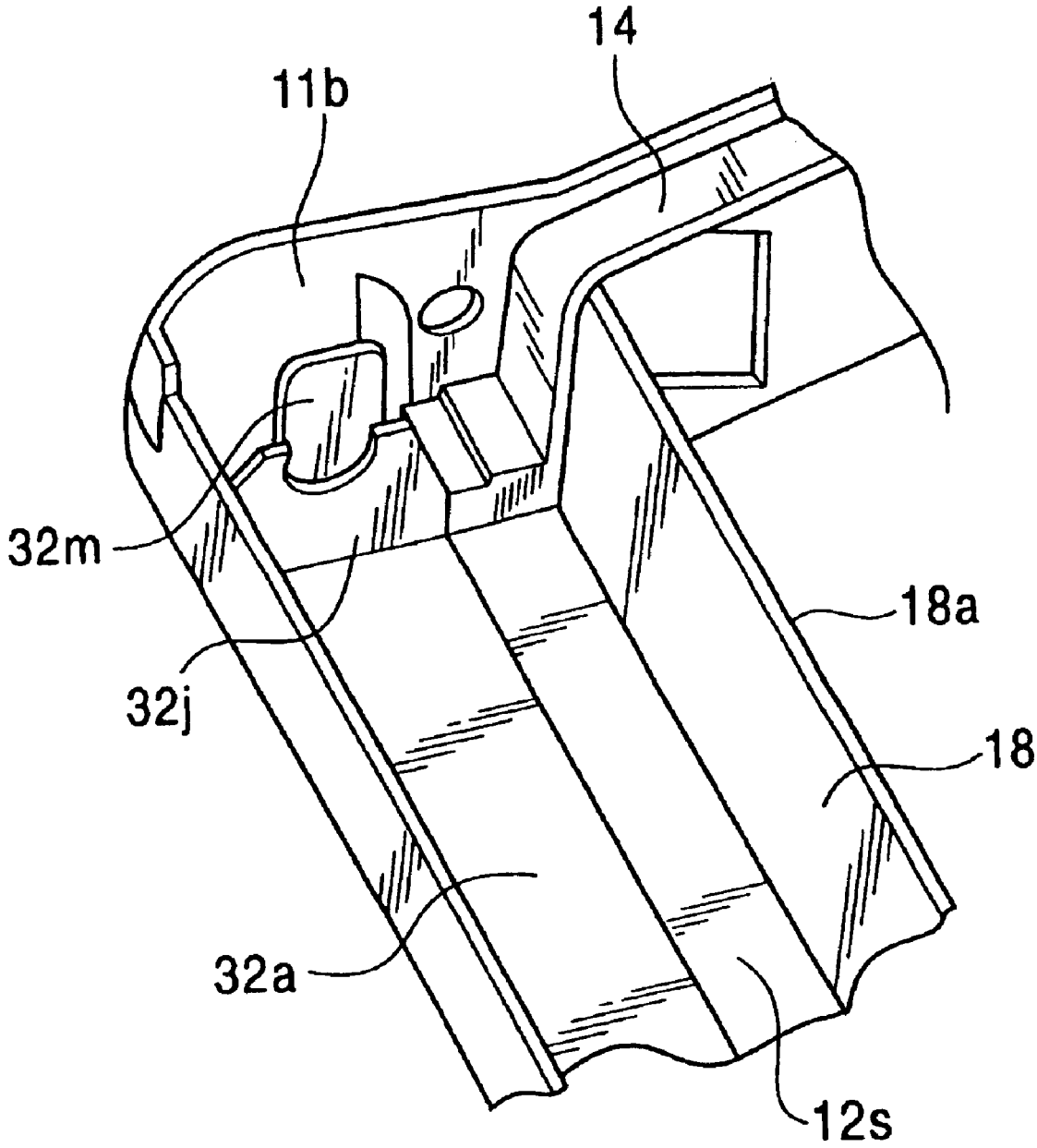
FIG. 8 is an enlarged perspective view of a main portion of a lower case of an ink ribbon cassette according to an embodiment of the present invention.
Figure 11:
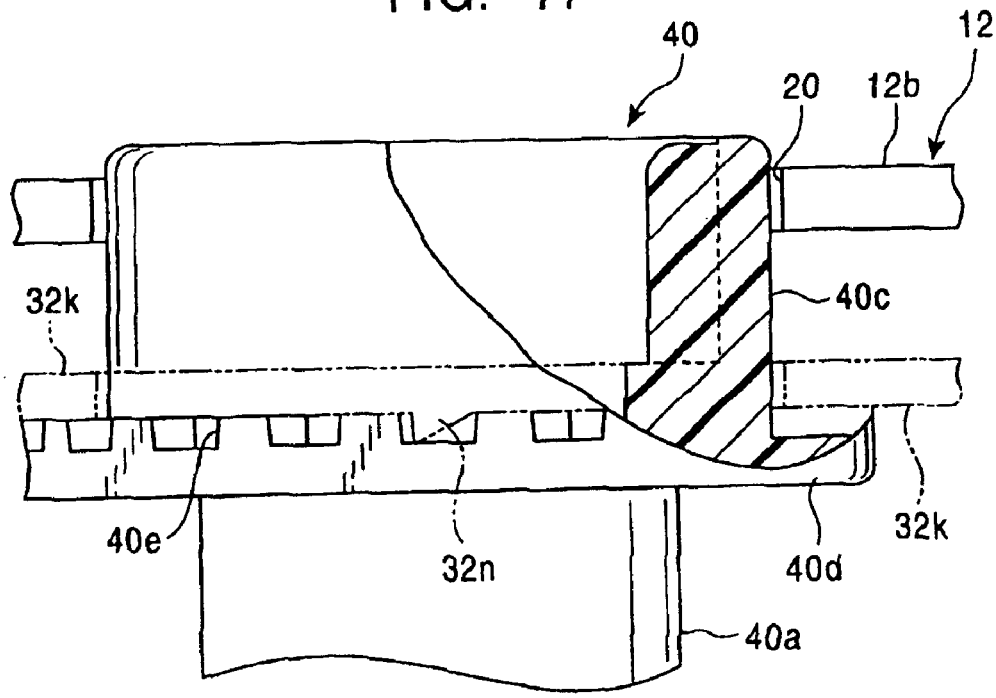
FIG. 11 is an enlarged perspective view illustrating the relationship between the cassette case and the ribbon core of an ink ribbon cassette according to an embodiment of the present invention.

At this time, while holding the forward end of the small diameter portion 40b of the feeding core 40 in elastic contact with the mold member 32m shown in FIG. 8, the small diameter portion 40b of the feeding core 40 is brought into contact with the first support wall 32j of the lower case 32, and the large diameter portion 40c of the feeding core 40 is caused to abut the second support wall 32k and the inner side of the opening 20 of the side surface portion 12b. As a result, as shown in FIG. 11, the engagement protrusion 32n of the lower case 32 is engaged with the rectangular groove 40e of the feeding core 40 to restrict the rotation of the feeding core 40, and the feeding core 40 is pressurized in the direction of the rotation shaft, whereby the engagement is canceled, and the feeding core 40 rotates smoothly while being rotatably supported by the first support wall 32j and the second support wall 32k.

Figure 14:
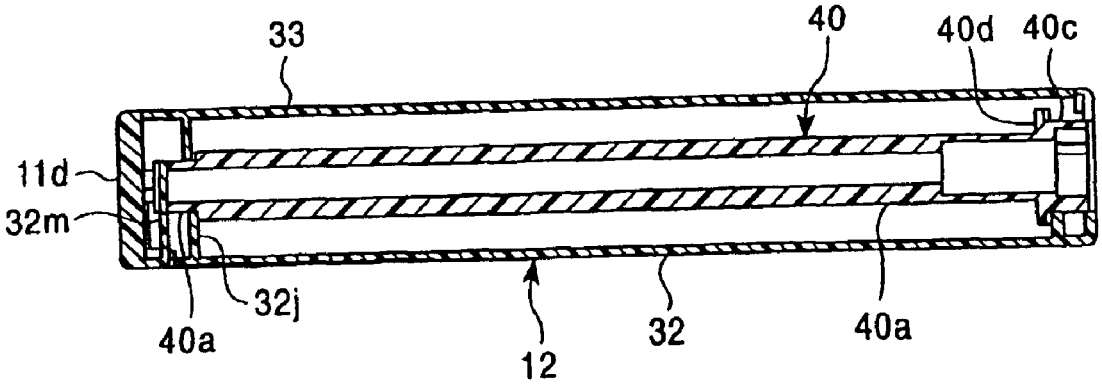
FIG. 14 is a schematic main portion sectional view illustrating a condition in which a feeding core is accommodated in a first accommodating portion of an ink ribbon cassette according to an embodiment of the present invention.

Next, while holding the forward end of the ink ribbon R wound around the feeding core 40 in slide contact with the shaft 19, it is pulled to the second semi-cylindrical portion 32b, and the first upper case 33 is inserted into the lower case 32 accommodating the feeding core 40, and the engagement claws 33d and 33e are fitted into hole portions (not shown) of the lower case 32 to thereby mount and fix the same (See FIG. 14).

Next, the take-up core 42 is prepared. To wind the forward end portion of the ink ribbon R wound around the feeding core 40 around the take-up core 42, the mold member 32m is pressurized in the direction of the rotation shaft with the feeding core 40, and the engagement of the engagement protrusion 32n of the lower case 32 with the rectangular groove 40e of the feeding core 40 is canceled, and the ink ribbon R is further pulled toward the take-up core 42, and the forward end of the ink ribbon R is glued by an adhesive (not shown) along a winding reference line (not shown) of the take-up core 42, wound several times and fixed (See FIG. 13).

Next, in the second semi-cylindrical portion 32b of the lower case 32, the forward end of the small diameter portion 42b of the take-up core 42 is brought into elastic contact with the mold member 32s, and the small diameter portion 42b of the take-up core 42 is brought into contact with the third support wall 32p, and the large diameter portion 42c of the take-up core 42 is brought into contact with the fourth support wall 32q and the inner side of the opening 28 of the side surface portion 13b. As a result, the engagement protrusion 32t of the lower case 32 is engaged with the rectangular groove 42e of the take-up core 42 to restrict the rotation of the take-up core 42, and the take-up core 42 is pressurized in the direction of the rotation shaft, whereby the take-up core 42 rotates smoothly while being rotatably supported by the third support wall 32p and the fourth support wall 32q.

Figure 13:
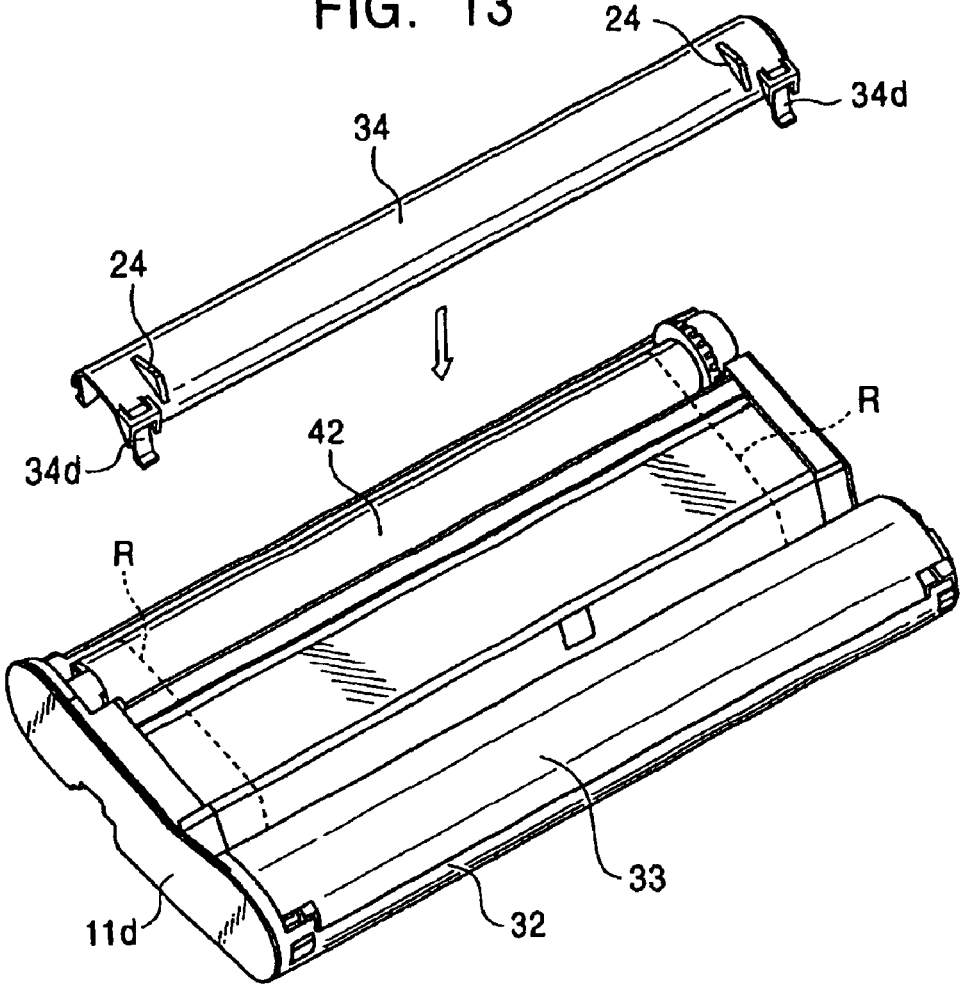
FIG. 13 is a perspective view of an ink ribbon cassette according to an embodiment of the present invention in a condition in which the upper case is removed therefrom.

After this, as shown in FIG. 13, the second upper case 34 is reliably mounted and fixed through the engagement claws 34d to the lower case 32 in which the feeding core 40, the upper case 33 and the take-up core 42 are incorporated, whereby the ribbon cassette 10 is completed.

Next, the construction of the line printer 50 to which this ribbon cassette 10 is attached will be schematically described with reference to FIG. 15.

The line printer 50 comprises a main body 50a, a cassette accommodating portion 51 which is an attachment portion for attaching the ribbon cassette 10 accommodated in the main body 50a, a printing mechanism portion 52 and a paper feeding portion 53.

The cassette accommodating portion 51 of an accommodating configuration in conformity with the configuration of the cassette case 11 of the ribbon cassette 10, and when the ribbon cassette 10 is accommodated, the engagement of the engagement protrusions 32n and 32t with the rectangular grooves 40e and 42e is canceled, and, due to a rotation drive mechanism (not shown), it is possible to rotate the feeding core 40 and the take-up core 42. Further, in the cassette accommodating portion 51, there is provided a detecting switch 100 equipped with an operating portion 100a, and the flat recess portions of the cutout portions 22a, 22b and 22c provided in the side surface portion 12b of the cassette case 11 come into and out of contact with the operating portion 100a, whereby the detecting switch is turned on and off to make it possible to recognize the kind of the ribbon cassette 10.

In the paper feeding portion 53, there is provided a paper tray 55 accommodating a plurality of recording paper sheets 54. Above the paper tray 55, there is provided a paper feeding roller 56 rotatably mounted to the main body 50a. This paper feeding roller 56 rotates while being in press contact with the uppermost portion of the recording paper sheets accommodated in the paper tray 55, thereby feeding the recording paper sheets 54 one by one in the direction of the arrow B.

In the printing mechanism portion 52, there is provided a platen 58 in the form of a cylindrical rotatable roller, and a thermal head 60 opposed to this platen 58 and which can be moved to and away from the platen is provided so as to be movable ikn the direction of the arrow C.

This thermal head 60 consists of a plurality of heat generating elements, and these heat generating elements are arranged so as to be substantially of the same size as the width of the ink ribbon R.

Further, in the printing mechanism portion 52, there are provided, close to the platen 58, a rotatable paper feeding roller 62 and a press contact roller 64 which can rotate while being held in press contact with the paper feeding roller 62.

In the main body 50a, there is provided between the paper feeding roller 62 and the press contact roller 64 and the paper feeding roller 56 an arcuate guide member 66 for guiding the recording paper sheets 54 in the feeding direction.

The ribbon cassette 10 of the present invention is attached to this line printer 50, and printing and recording is performed as described below.

First, the ribbon cassette 10 provided with an ink ribbon R of a desired color is mounted in the cassette accommodating portion 51.

Next, a desired item of printing information is selected from a plurality of items of printing information, and, after the selection, the paper feeding roller 56 is rotated in a condition in which the forward end (the right-hand side in FIG. 15) of the uppermost portion of the recording paper sheets 54 accommodated in the paper tray 55 are being held in press contact with the paper feeding roller 56.

The paper feeding roller 56 is rotated to feed the recording paper sheets 54 in the paper feeding direction B. and the recording paper sheets 54 move while being pressurized downward by the guide member 66 between the paper feeding roller 62 and the press contact roller 64 held in press contact with the paper feeding roller 62.

Subsequently, while holding the recording paper sheet 54 in press contact between the paper feeding roller 62 and the press contact roller 64, the recording paper sheet 54 is fed to the gap between the platen 58 and the thermal head 60, which are in a separated state, by the clockwise rotation of the paper feeding roller 62.

And, in a condition in which the printing start position of the recording paper sheet 54 is matched with the portion of the thermal heat where the heat generating elements are formed, the rotation of the paper feeding roller 62 and the paper feeding roller 56 is stopped.

Between the thermal head 60 and the recording paper sheet 54, there is arranged the ink ribbon R to which ink of the desired color is applied, with the ink ribbon being partly exposed through the hole portion 15 from the ribbon cassette 10 in the cassette accommodating portion 51.

And, the thermal head 60 is moved to the platen 58 side (in the direction of the arrow C), and in a condition in which the ink ribbon R and the recording paper sheet 54 are superimposed one upon the other, they are brought into press contact with the platen 58, and according to the above-mentioned desired item of information, the heat generating elements of the thermal head 60 are selectively caused to generate heat, and the ink of the ink ribbon R is thermally transferred to the recording paper sheet 54 to perform desired printing and recording.

Figure 15:
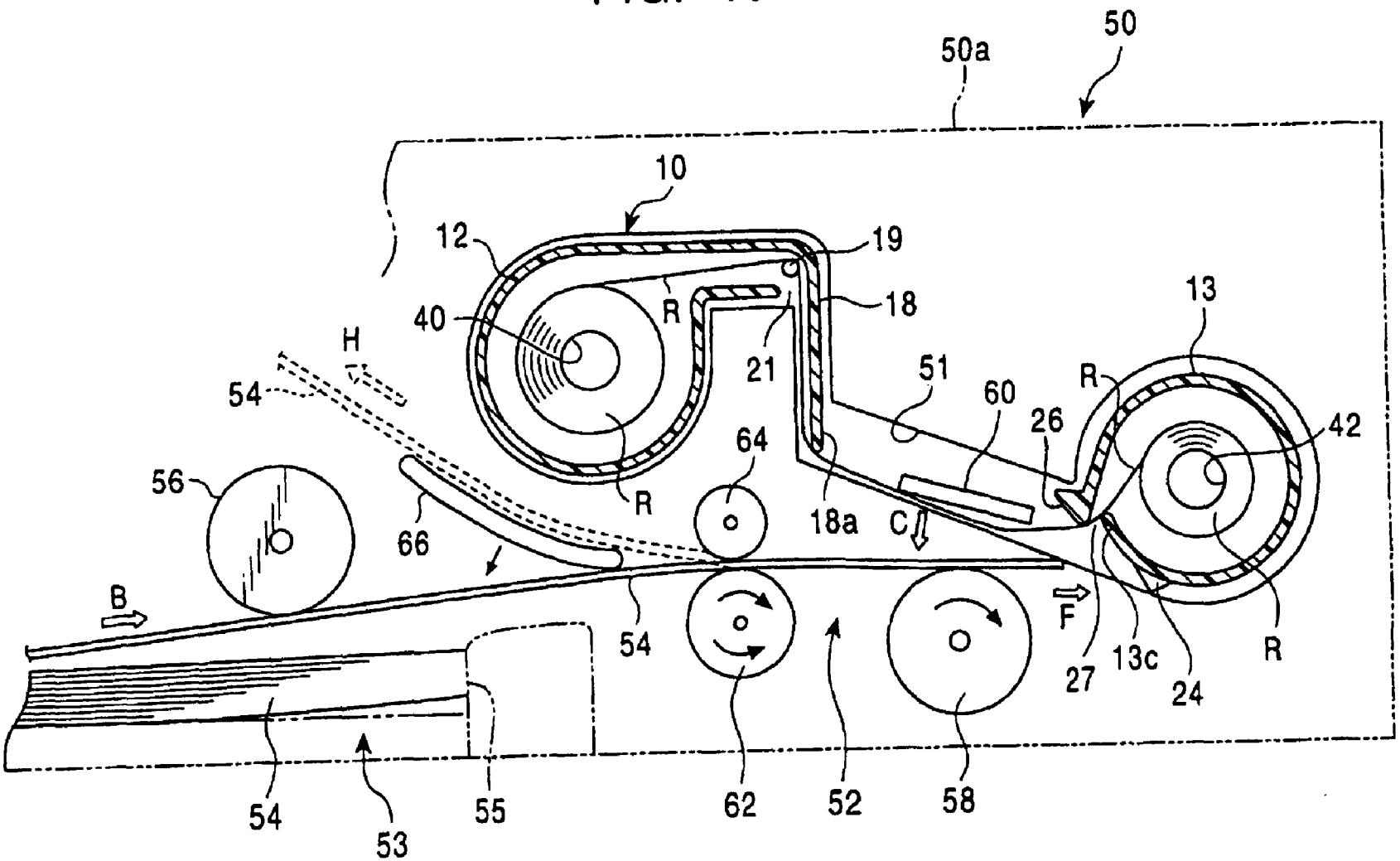
FIG. 15 is a schematic main portion view illustrating an operation condition of a thermal transfer printer to which an ink ribbon cassette according to an embodiment of the present invention is attached.

As shown in FIG. 15, the ink ribbon R used for printing and recording is caused to run as follows.

First, the ink ribbon R fed out horizontally from the feeding core 40 of the ribbon cassette 10 is bent below (approximately 90 degrees) of the main body 50a of the line printer 50 by the shaft 19, and led out from the feeding outlet 21. Further, the ink ribbon R which has been led out is guided out along the wall portion 18 of the cassette case 11, and brought into slide contact with the edge portion 18a of the wall portion 18 thereof, whereby the ribbon is bent to the take-up core 42 side by an obtuse angle and exposed through the hole portion 15 (See FIG. 1).

The running path for the ink ribbon R is formed in a crank-like fashion by the shaft (first support portion) 19 and the edge portion (second support portion) 18a of the wall portion 18, and a fixed tension is added until it reaches the thermal head 60.

After printing and recording has been performed by using an ink of a desired color, the ink ribbon R is separated from the recording paper sheet 54, and the take-up core 42 of the ribbon cassette 10 is rotated by a driving mechanism (not shown). The ink ribbon R, from which ink has been separated in accordance with the printing configuration, is wound around the take-up core 42 in the second accommodating portion 13 of the cassette case 11 through the take-up inlet 27 while being sequentially brought into slide contact with the flange portion 26 and the edge portion 13c.

Figure 16:
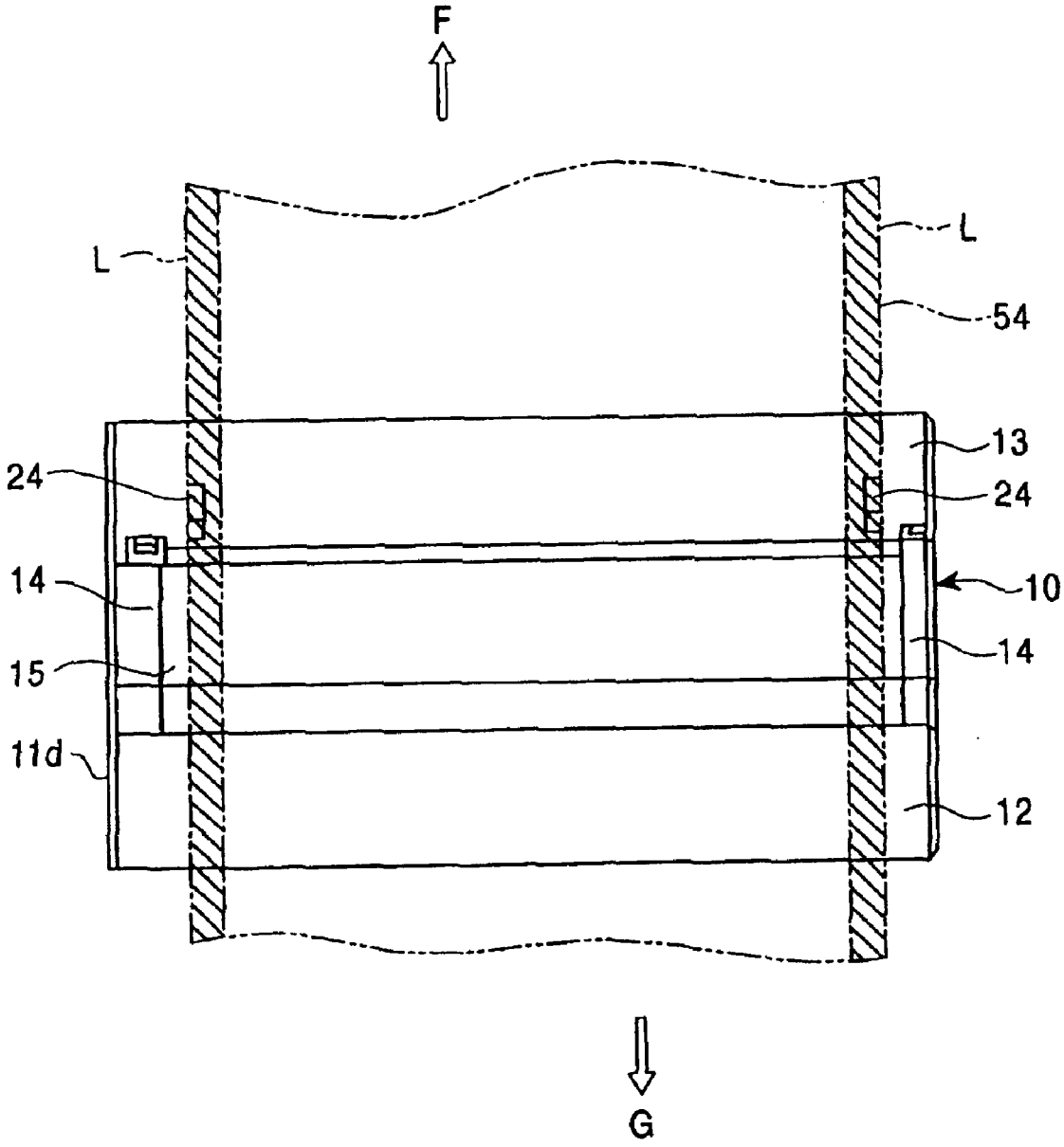
FIG. 16 is a schematic main portion view illustrating a recording paper feeding operation of a thermal transfer printer to which an ink ribbon cassette according to an embodiment of the present invention is attached.

Next, as shown in FIG. 16, the printing paper sheet 54 on which printing and recording has been conducted is held between the paper feeding roller 62 and the press contact roller 64, and by the rotation of the paper feeding roller 62, the recording paper sheet 54 moves in the direction of the arrow F, with both edge portions of the recording paper sheet 54 being in slide contact with the guide protrusion 24 of the second upper case 34 of the ribbon cassette 10.

The edge portions of the recording paper sheet 54 constitute the marginal portion L other than the region where printing and recording is conducted, and the recording paper sheet is guided and fed downward with its marginal portion L being held in slide contact, without the printed/recorded portion of the recording paper sheet 54 directly touching the cassette case 11 of the ribbon cassette 10. Thus, the feeding can be conducted while maintaining a satisfactory printing/recording condition, without the surface of the printed/recorded region being rubbed.

Next, after the printing and recording has been conducted, the platen 58 is restored to the original position where it is separated from the thermal head 60, and the recording paper sheet 54 is fed while being held in elastic contact with the rotating press contact roller 64 by the counterclockwise rotation of the paper feeding roller 62, and the forward end comes into slide contact with the upper surface portion of the guide member 66 situated below before the paper sheet is discharged in the direction of the arrow H of FIG. 15.

When discharging the recording paper sheet 54, the paper feeding roller 62 is reversely rotated to discharge the recording paper sheet 54 in the direction of the arrow G. At this time, it is possible to perform the discharge with the marginal portion L of the recording paper sheet 54 being in slide contact with the guide protrusions 24, so that the printed/recorded region of the recording paper sheet 54 is not rubbed.

In color printing/recording, the paper feeding roller 62 is rotated clockwise in FIG. 15, and the recording paper sheet 54 is fed again to the gap between the platen 58 and the thermal head 60, and in a condition in which the ink ribbon R is wound around the take-up core 42 and inks of different colors are arranged between the thermal head 60 and the platen 58, the ink ribbon R and the recording paper sheet 54 are brought into press contact with the thermal head 60 to perform printing and recording in inks of different colors on the recording paper sheet 54.

The recording paper sheet 54 on which printing and recording has been conducted in inks of predetermined colors is discharged to the exterior of the line printer 50 while sliding over the guide member 66 by rotating the paper feeding roller 62 counterclockwise in FIG. 15.

In the ribbon cassette 10 thus attached to the line printer 50, the cassette case 11 is formed in a rectangular configuration and the unnecessary space is reduced, thereby making it possible to achieve a reduction in size. Thus, in the line printer 50, to which the ribbon cassette is attached, it is possible to effectively utilize the space portion, making it possible to achieve a reduction in the size of the entire line printer 50.

Further, between the shaft 19 and the edge portion 18a of the wall portion 18, a fixed tension is imparted to the ink ribbon running therebetween, and the running can be effected in a stable manner, so that it is possible to prevent trouble such as jamming, making it possible to reliably perform printing and recording with the ink ribbon R.

Further, since a fixed tension is imparted to the ink ribbon R which is in slide contact with the shaft 19 connecting the side plate portion 11d and the side surface portion 12b of the cassette case 11, the generation of creases in the ink ribbon R is restrained, making it possible for the taking up of the ink ribbon R to be conducted smoothly.

Further, by making the shaft 19 rotatable, it is possible to cause the ink ribbon R to run more smoothly even if a large external force is applied to the ink ribbon R.

Further, between the first accommodating portion 12 of the cassette case 11 and the connecting members 14, there is provided the wall portion 18 connecting the connecting members 14, and a predetermined space is provided opposite to the peripheral wall portion 12a of the first accommodating portion 12, so that there is no fear of the ink ribbon R being brought into contact with the cassette case 11 and rubbed. Further, since the heat of the thermal head 60, etc. is cut off by the wall portion 18, it is possible to prevent deformation, damage or the like due to the heat, etc.

What is claimed is:

1. An ink ribbon cassette for a thermal transfer printer comprising:

a cassette case having a first accommodating portion, a second accommodating portion arranged so as to be spaced apart by a predetermined distance from the first accommodating portion, and a connecting portion connecting the first and second accommodating portions, a feeding core and a take-up core rotatably accommodated respectively in the first and second accommodating portions, and an ink ribbon wider than a printing width which can be fed from the feeding core and taken up by the take-up core, wherein there is provided in the first accommodating portion in a vicinity of a feeding outlet for the ink ribbon a first support portion extending along an ink ribbon width direction, wherein there is provided in the connecting portion a second support portion opposed to the first support portion, *the first support portion comprising a shaft connecting a side plate portion of the cassette case and a side surface portion of the first accommodating portion,* and wherein the ink ribbon fed out from the feeding core is bent at the first support portion, and then bent in an opposite direction by the second support portion before the ink ribbon is taken up by the take-up core.

2. An ink ribbon cassette according to claim 1, wherein the first support portion consists of a shaft connecting a side plate portion of the cassette case and a side surface portion of the first accommodating portion.

3. An ink ribbon cassette according to claim [2] *1*, wherein the shaft is rotatable around an axis.

4. An ink ribbon cassette according to claim 1, wherein the connecting portion consists of a pair of connecting members connecting end portions of the first and second accommodating portions, the second support portion consisting of a wall portion partially connecting the pair of connecting members.

[5. An ink ribbon cassette according to claim 1, wherein the first support portion comprises a shaft connecting a side plate portion of the cassette case and a side surface portion of the first accommodating portion.]

6. An ink ribbon cassette according to claim 1, wherein the connecting portion comprises a pair of connecting members connecting end portions of the first and second accommodating portions, the second support portion comprising a wall portion partially connecting the pair of connecting members.

*7. An ink ribbon cassette, comprising:*

*a first accommodating portion adapted to support a first core for rotation about a first axis;*

*a second accommodating portion spaced apart from and fixed relative to the first accommodating portion, where the second accommodating portion is adapted to support a second core for rotation about a second axis that is generally parallel with the first axis; and*

*first and second support portions disposed to form a substantially crank-shaped travel path proximate the first accommodating portion for an ink ribbon connected between the first core and the second core, where the substantially crank-shaped travel path intersects a plane extending between the first and second axes.*

*8. The ink ribbon cassette of claim 7, where the second accommodating portion is spaced from and fixed relative to the first accommodating portion by a pair of connecting*

*portions disposed proximate opposite ends of the first and second accommodating portions.*

*9. The ink ribbon cassette of claim 8, where the connecting portions define an open area therebetween through which an ink ribbon may travel between the first and second accommodating portions.*

*10. The ink ribbon cassette of claim 7, where the second support portion comprises a wall intersecting the plane extending between the first and second axes.*

*11. The ink ribbon cassette of claim 7, where the first support portion comprises an edge portion of a wall extending generally in a direction toward the second accommodating portion.*

*12. The ink ribbon cassette of claim 11, where the second support portion comprises a wall that is generally perpendicular to the wall forming the first support portion.*

*13. The ink ribbon cassette of claim 12, where the first and second support portions are disposed on a common side of the plane intersecting the first and second axes.*

*14. The ink ribbon cassette of claim 12, where the first accommodating portion comprises an exterior wall that is spaced from the wall of the second support portion.*

*15. The ink ribbon cassette of claim 7, further comprising an ink ribbon connected between the first core and the second core along the substantially crank-shaped travel path.*

*16. The ink ribbon cassette of claim 15, wherein the ink ribbon is adapted for use in a thermal transfer printing process.*

*17. The ink ribbon cassette of claim 16, where the ink ribbon has regions adapted to print different colors.*

*18. The ink ribbon cassette of claim 15, where the ink ribbon has a width that is at least equal to a printing width.*

*19. The ink ribbon cassette of claim 7, further comprising:*

*a first mechanism disposed to alternately inhibit and allow rotation of the first core about the first axis in response to a force applied in a direction along the first axis; and*

*a second mechanism disposed to alternately inhibit and allow rotation of the second core about the second axis in response to a force applied in a direction along the second axis.*

*20. The ink ribbon cassette of claim 7, where the first support portion comprises a shaft having a length at least equal to a width of an ink ribbon and disposed transverse to a direction of motion of the ink ribbon.*

*21. A thermal transfer printer, comprising:*

*a main body;*

*a printing mechanism portion disposed in the main body;*

*a paper feeding portion disposed in the main body to provide paper to the printing mechanism portion;*

*an ink ribbon cassette accommodated in the main body and associated with the printing mechanism portion to thermally transfer ink from an ink ribbon disposed in the ink ribbon cassette to paper provided by the paper feeding portion, where the ink ribbon cassette comprises*

*a first accommodating portion adapted to support a first core for rotation about a first axis,*

*a second accommodating portion spaced apart from and fixed relative to the first accommodating portion, where the second accommodating portion is adapted to support a second core for rotation about a second axis that is generally parallel with the first axis,*

*an ink ribbon connected between the first and second accommodating portions, and*

*first and second support portions disposed to form a substantially crank-shaped travel path for the ink ribbon proximate the first accommodating portion, where the substantially crank-shaped travel path intersects a plane extending between the first and second axes.*

*22. The thermal transfer printer of claim 21, where the second support portion comprises a wall intersecting the plane extending between the first and second axes.*

*23. The thermal transfer printer of claim 21, where the first support portion comprises an edge portion of a wall extending generally in a direction toward the second accommodating portion.*

*24. The thermal transfer printer of claim 23, where the second support portion comprises a wall that is generally perpendicular to the wall forming the first support portion.*

*25. The thermal transfer printer of claim 24, where the first and second support portions are disposed at a common side of the plane intersecting the first and second axes.*

*26. The thermal transfer printer of claim 24, where the first accommodating portion comprises an exterior wall that is spaced from the wall of the second support portion.*

*27. The thermal transfer printer of claim 21, further comprising:*

*a first mechanism disposed to alternately inhibit and allow rotation of the first core about the first axis in response to a force applied in a direction along the first axis; and*

*a second mechanism disposed to alternately inhibit and allow rotation of the second core about the second axis in response to a force applied in a direction along the second axis.*

*28. The thermal transfer printer of claim 21, where the first support portion comprises a shaft having a length at least equal to a width of an ink ribbon and disposed transverse to a direction of motion of the ink ribbon.*

*29. An ink ribbon cassette, comprising:*

*means for accommodating a first core for rotation about a first axis;*

*means for accommodating a second core for rotation about a second axis, where the means for accommodating the second core is spaced apart from and fixed relative to the means for accommodating the first core; and*

*means for forming a substantially crank-shaped ink ribbon travel path proximate the means for accommodating the first core, where the substantially crank-shaped ink ribbon travel path intersects a plane extending between the first and second axes.*

*30. The ink ribbon cassette of claim 29, where the means for forming a substantially crank-shaped ink ribbon travel path comprises:*

*a first support disposed to engage an ink ribbon along a width thereof; and*

*a second support disposed generally parallel to the first support to engage the ink ribbon along a width thereof, where the first and second supports are arranged to engage opposite faces of the ink ribbon.*

*31. The ink ribbon cassette of claim 30, where the first and second supports are disposed at a common side of the plane extending between the first and second axes.*

*32. A thermal transfer printer, comprising:*

*means for printing; and*

*cassette means for supporting an ink ribbon proximate the means for printing, the cassette means comprising*

*means for accommodating a first ink ribbon core for rotation about a first axis,*

*means for accommodating a second ink ribbon core for rotation about a second axis, where the means for*

*accommodating the second ink ribbon core is spaced apart from and fixed relative to the means for accommodating the first ink ribbon core, and*

*means for forming a substantially crank-shaped ink ribbon travel path proximate the means for accommodating the first ink ribbon core, where the substantially crank-shaped ink ribbon travel path intersects a plane extending between the first and second axes.*

*33. The thermal transfer printer of claim 32, where the means for forming a substantially crank-shaped ink ribbon travel path comprises:*

*a first support disposed to engage an ink ribbon along a width thereof; and*

*a second support disposed generally parallel to the first support to engage the ink ribbon along a width thereof, where the first and second supports are arranged to engage opposite faces of the ink ribbon.*

*34. The thermal transfer printer of claim 33, where the first and second supports are disposed at a common side of the plane extending between the first and second axes.*

* * * * *